United States Patent
Son et al.

(10) Patent No.: US 11,973,203 B2
(45) Date of Patent: Apr. 30, 2024

(54) BATTERY PACK COMPRISING BATTERY FRAME

(71) Applicant: LG CHEM, LTD., Seoul (KR)

(72) Inventors: Hyuk-Joon Son, Daejeon (KR); Young-Su Son, Daejeon (KR); Young-Kyu Lee, Daejeon (KR); Jae-Young Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/758,588

(22) PCT Filed: Jul. 24, 2019

(86) PCT No.: PCT/KR2019/009176
§ 371 (c)(1),
(2) Date: Apr. 23, 2020

(87) PCT Pub. No.: WO2020/036331
PCT Pub. Date: Feb. 20, 2020

(65) Prior Publication Data
US 2020/0350527 A1    Nov. 5, 2020

(30) Foreign Application Priority Data

Aug. 14, 2018  (KR) .................... 10-2018-0095105

(51) Int. Cl.
*H01M 10/653* (2014.01)
*H01M 10/42* (2006.01)
(Continued)

(52) U.S. Cl.
CPC ....... *H01M 10/653* (2015.04); *H01M 10/425* (2013.01); *H01M 50/211* (2021.01);
(Continued)

(58) Field of Classification Search
CPC .................................................. H01M 10/653
See application file for complete search history.

(56) References Cited

U.S. PATENT DOCUMENTS

2005/0079412 A1    4/2005  Kim
2006/0216569 A1    9/2006  Choi et al.
(Continued)

FOREIGN PATENT DOCUMENTS

CN    103633261 A    3/2014
CN    205900643 U    3/2024
(Continued)

OTHER PUBLICATIONS

Extended European Search Report dated Feb. 8, 2021 for European Application No. 19850607.3.
(Continued)

*Primary Examiner* — Maria Laios
*Assistant Examiner* — Jordan E Berresford
(74) *Attorney, Agent, or Firm* — Birch, Stewart, Kolasch & Birch, LLP (57) ABSTRACT

A battery pack is provided including at least one rechargeable secondary battery; a battery frame having a battery accommodation portion configured to accommodate the at least one secondary battery; a packaging member provided in the form of an adhesion sheet having an adhesive surface formed at one surface thereof, the packaging member including a body portion fixedly adhered to an upper portion of the secondary battery accommodated in the battery frame and a fixing portion bent and extended downward from the body portion and having the adhesive surface fixedly adhered to an outer surface of an outermost edge of the battery frame; and an anti-noise member attached to at least one portion of the adhesive surface of the packaging member.

11 Claims, 7 Drawing Sheets

(51) Int. Cl.
   *H01M 50/211*   (2021.01)
   *H01M 50/233*   (2021.01)
   *H01M 50/262*   (2021.01)

(52) U.S. Cl.
   CPC ....... *H01M 50/233* (2021.01); *H01M 50/262* (2021.01); *H01M 2010/4271* (2013.01); *H01M 2220/30* (2013.01)

(56) References Cited

U.S. PATENT DOCUMENTS

| | | | |
|---|---|---|---|
| 2011/0097617 A1 | 4/2011 | Gu et al. | |
| 2011/0111649 A1* | 5/2011 | Garascia | H01M 10/4257 337/414 |
| 2012/0214023 A1 | 8/2012 | Koh | |
| 2013/0207459 A1* | 8/2013 | Schroder | B60L 50/64 307/10.1 |
| 2014/0050968 A1 | 2/2014 | Park | |
| 2014/0220388 A1* | 8/2014 | Lee | H01M 10/425 429/7 |
| 2014/0220423 A1 | 8/2014 | Yi et al. | |
| 2015/0064505 A1 | 3/2015 | Lee | |
| 2015/0140362 A1 | 5/2015 | Lee et al. | |
| 2015/0147599 A1 | 5/2015 | Lee | |
| 2016/0072160 A1 | 3/2016 | Hwang | |
| 2016/0218396 A1 | 7/2016 | Park et al. | |
| 2017/0301905 A1 | 10/2017 | Takeda et al. | |

FOREIGN PATENT DOCUMENTS

| | | |
|---|---|---|
| JP | 2002-216725 A | 8/2002 |
| JP | 2003-331803 A | 11/2003 |
| JP | 2005-11816 A | 1/2005 |
| JP | 2015-26558 A | 2/2015 |
| KR | 10-1274903 B1 | 6/2013 |
| KR | 10-2015-0026111 A | 3/2015 |
| KR | 10-2015-0057887 A | 5/2015 |
| KR | 10-2015-0127347 A | 11/2015 |
| KR | 10-2016-0028749 A | 3/2016 |
| KR | 10-2016-0092323 A | 8/2016 |
| KR | 10-2018-0049696 A | 5/2018 |

OTHER PUBLICATIONS

International Search Report issued in PCT/KR2019/009176 (PCT/ISA/210), dated Oct. 28, 2019.

* cited by examiner

BATTERY PACK COMPRISING BATTERY FRAME

TECHNICAL FIELD

The present disclosure relates to a battery pack including an anti-noise member and a battery frame, and more particularly, to a battery pack including an effective anti-noise member and a lightweight battery frame.

The present application claims priority to Korean Patent Application No. 10-2018-0095105 filed on Aug. 14, 2018 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The secondary battery is highly applicable to various products and has electrical characteristics with high energy density. The secondary battery is applied not only to portable electronic devices but also to electric vehicles, hybrid electric vehicles, power storage devices, and the like, driven by an electric driving source.

The secondary battery is attracting attention as a new energy source for improving eco-friendliness and energy efficiency since the use of fossil fuels is significantly reduced and no by-product is generated during the use of energy.

Meanwhile, electronic devices such as notebooks, mini notebooks, netbooks, smart phones and portable multimedia players (PMPs) generally have a mobile power source. The electronic device uses a battery pack in which a plurality of secondary batteries are connected in series and/or in parallel. The battery pack includes a protective circuit module (PCM) for protecting the secondary batteries from overcharge, overdischarge or overcurrent, and the secondary battery and the protection circuit module are embedded together in a frame.

Also, recently, due to the miniaturization of the electronic device, the battery pack is required to have a minimized volume. The battery pack applied to the electronic device may be configured to fix and protect the secondary batteries and the protection circuit module inside the frame attach by attaching a label in the form of an adhesive sheet having an adhesive surface to the frame having a frame shape to reduce thickness.

In addition, as the thickness of the electronic device becomes thin, the electronic device may have increased flexibility, and the battery pack accommodated inside the electronic device may also be bent or deformed together with the electronic device.

Accordingly, even when a user merely presses a touch pad of the electronic device, the battery pack may be bent or deformed. Thus, the adhesion surface of the label may be repeatedly bonded to or separated from the secondary batteries or the frame. In this case, noise may be generated frequently, which may cause inconvenience to the user.

DISCLOSURE

Technical Problem

The present disclosure is designed to solve the problems of the related art, and therefore the present disclosure is directed to providing a battery pack including an effective anti-noise member and a lightweight battery frame.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:

at least one rechargeable secondary battery;

a battery frame having a battery accommodation portion configured to accommodate the at least one secondary battery;

a packaging member provided in the form of an adhesion sheet having an adhesive surface formed at one surface thereof, the packaging member including a body portion fixedly adhered to an upper portion of the secondary battery accommodated in the battery frame and a fixing portion bent and extended downward from the body portion and having an adhesive surface fixedly adhered to an outer surface of an outermost edge of the battery frame; and an anti-noise member attached to at least one portion of the adhesive surface of the packaging member.

Also, the battery pack may further comprise a battery management unit configured to control charging and discharging of the at least one secondary battery.

Moreover, a control accommodation portion having a recessed space to accommodate the battery management unit may be formed at the battery frame.

In addition, the anti-noise member may be formed at a portion of the adhesive surface of the packaging member, which faces the battery management unit.

Also, the anti-noise member may have a ridged portion extending to be in close contact with an outer surface of the battery management unit.

Moreover, an uneven structure dented or protruding according to the shape of an outer surface of the battery management unit or the control accommodation portion may be formed at the ridged portion of the anti-noise member.

In addition, a thermally conductive material may be added between the anti-noise member and the battery management unit so that no gap is created therebetween.

Further, at least one dented groove recessed inward and extending along an edge direction of the outermost edge may be formed at a horizontal outer surface of the outermost edge of the battery frame.

Also, the anti-noise member may be formed at a portion of the adhesive surface of the packaging member, which faces the dented groove.

Moreover, a rib protruding outward and extending from one inner side of the dented groove to the other inner side thereof may be formed at the dented groove of the battery frame.

In addition, the battery pack may comprise two or more secondary batteries, and a barrier extending from one inner side of the outermost edge of the battery frame to the other inner side thereof may be formed in the battery accommodation portion of the battery frame so that the two or more secondary batteries are separately accommodated therein.

Further, a vertical height of the barrier may be lower than a height of an upper portion of the two or more secondary batteries accommodated in the battery accommodation portion.

Also, the battery pack may comprise two or more secondary batteries, and a barrier extending from one inner side of the outermost edge of the battery frame to the other inner side thereof may be formed in the battery accommodation portion of the battery frame so that the two or more secondary batteries are separately accommodated therein.

Moreover, the anti-noise member may be formed at a portion of the adhesive surface of the packaging member, which faces the barrier.

In addition, the fixing portion of the packaging member may be bent and extended inward so that the adhesive surface thereof is attached to a lower surface of the secondary battery.

Further, a support protrusively extending inward to support a lower portion of the secondary battery upward may be formed at an inner surface of an inner space of the battery accommodation portion.

In another aspect of the present disclosure, there is also provided an electronic device, comprising the battery pack.

In still another aspect of the present disclosure, there is also provided an electronic system, comprising the electronic device.

Advantageous Effects

According to an embodiment of the present disclosure, since the battery pack includes an anti-noise member attached to at least one portion of the adhesive surface of the packaging member, it is possible to prevent that the adhesive surface of the packaging member attached to a portion of the outer surface of the battery frame, where the packaging member is easily detached, is separated therefrom to generate noise.

Further, according to an embodiment of the present disclosure, since the anti-noise member is formed on the adhesive surface of the packaging member at a portion corresponding to the control accommodation portion accommodating the noisy battery management unit, where noise is generated frequently, it is possible to significantly reduce the noise generated from the battery pack. Accordingly, the electronic device including the battery pack may be used conveniently.

In addition, according to an embodiment of the present disclosure, since a ridged portion configured to be in close contact with the battery management unit is formed on the anti-noise member, it is possible to reduce the gap that may be formed between the packaging member and the battery management unit as much as possible, thereby effectively reducing the noise generated from the battery pack.

Also, according to another embodiment of the present disclosure, since an uneven structure is formed at the ridged portion of the anti-noise member configured to closely contact the battery management unit, the gap that may be formed between the packaging member and the printed circuit board of the battery management unit may be reduced as much as possible. Accordingly, the noise generated from the battery pack may be further reduced.

Moreover, according to another embodiment of the present disclosure, when a thermally conductive material is added to be interposed between the anti-noise member and the battery management unit, the empty space that may be created between the anti-noise member and the battery management unit may be minimized, thereby preventing the noise generated due to the empty space in advance and reducing the amount of air occupied in the empty space. In addition, the thermal conductivity of the heat generated from the secondary battery may be significantly increased, thereby improving the cooling efficiency of the battery pack.

In addition, according to an embodiment of the present disclosure, since the dented groove formed at the battery frame of the present disclosure may reduce the weight of the battery frame, it is possible to reduce the weight of the battery pack.

Further, according to another embodiment of the present disclosure, since the anti-noise member of the present disclosure is formed on at least a portion of the adhesive surface of the packaging member that faces the barrier, it is possible to prevent the barrier from contacting the adhesive surface of the packaging member. Accordingly, since the adhesion of the barrier and the packaging member is prevented, it is possible to reduce the noise generated by the packaging member that is attached to and detached from the upper surface of the barrier.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
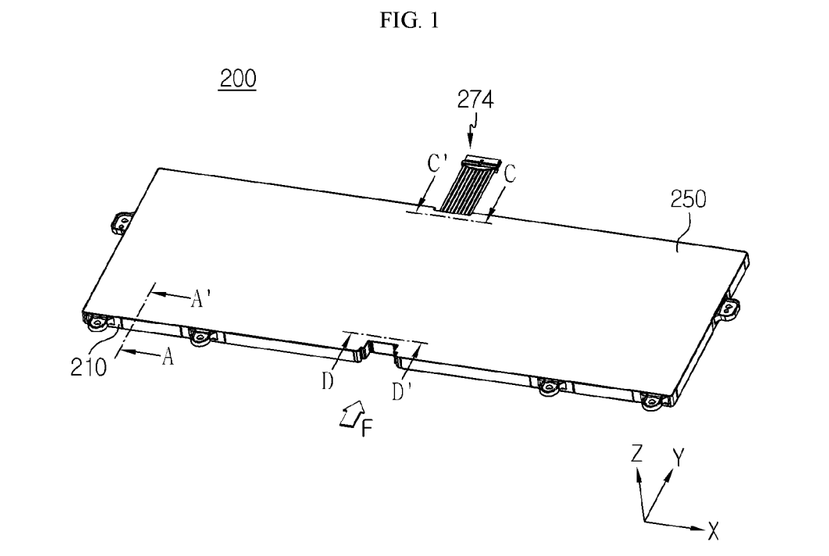
FIG. 1 is a perspective view schematically showing a battery pack according to an embodiment of the present disclosure.
Figure 2:
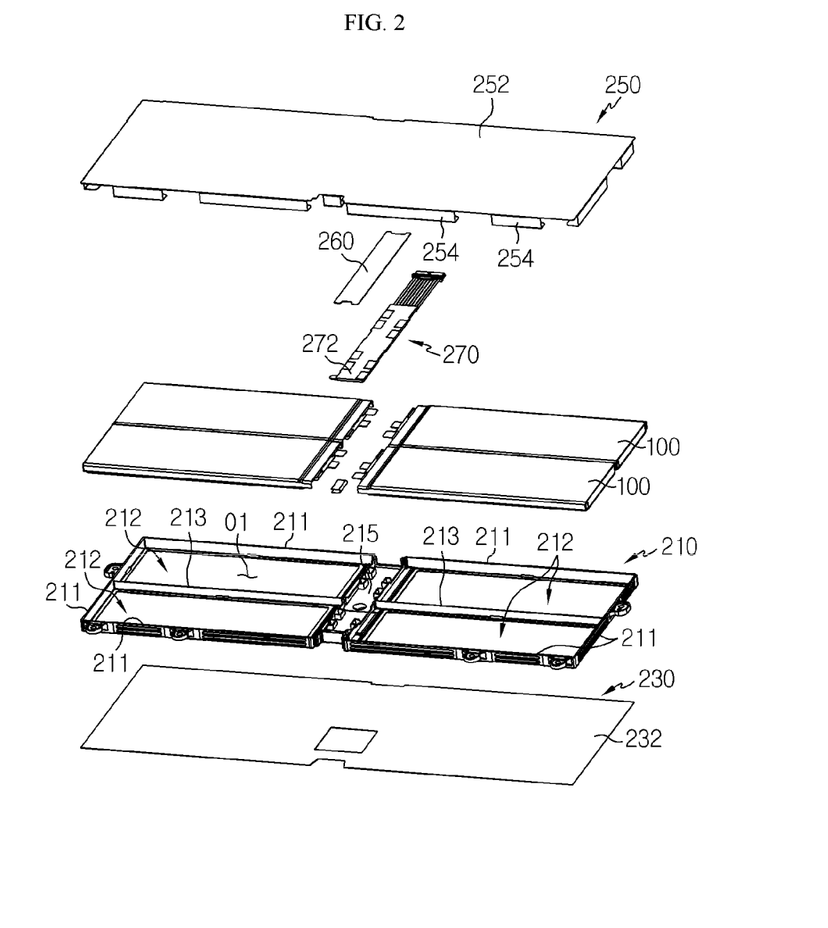
FIG. 2 is an exploded perspective view schematically showing the battery pack according to an embodiment of the present disclosure.

FIG. 1 is a perspective view schematically showing a battery pack according to an embodiment of the present disclosure. FIG. 2 is an exploded perspective view schematically showing the battery pack according to an embodiment of the present disclosure. Also, FIG. 3 is a plan view schematically showing a secondary battery, employed at the battery pack according to an embodiment of the present disclosure.

Figure 3:
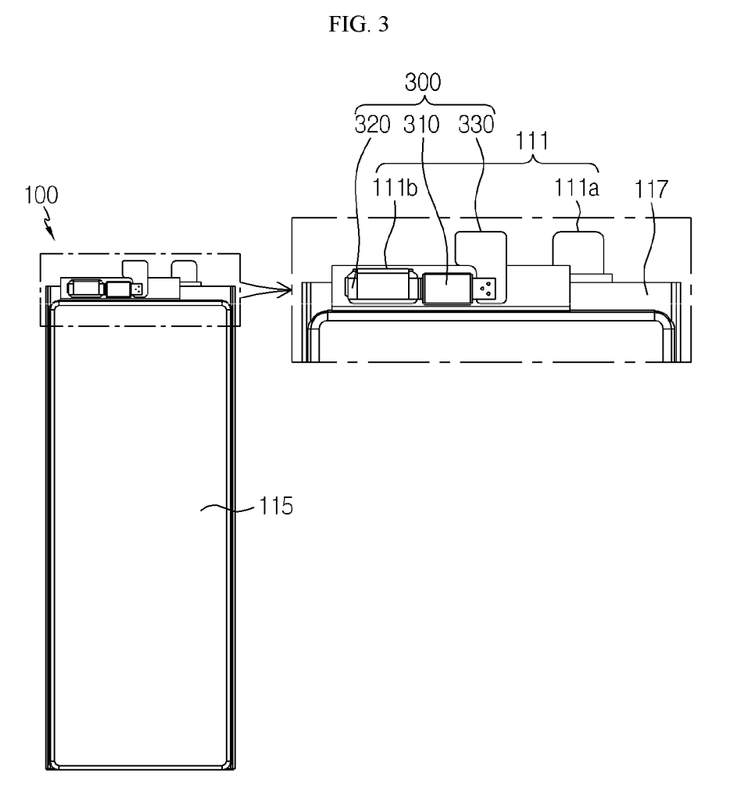
FIG. 3 is a plan view schematically showing a secondary battery, employed at the battery pack according to an embodiment of the present disclosure.

Referring to FIGS. 1 to 3, a battery pack 200 includes at least one rechargeable secondary battery 100, a battery frame 210, a packaging member 250, and an anti-noise member 260.

First of all, referring to FIG. 3 again, the secondary battery 100 may be a pouch-type secondary battery 100. In particular, here, the pouch-type secondary battery 100 may include an electrode assembly (not shown), an electrolyte (not shown) and a pouch exterior 115.

Here, the electrode assembly (not shown) may be configured such that at least one positive electrode plate and at least one negative electrode plate are disposed with a separator being interposed therebetween. More specifically, the electrode assembly may be classified into a winding type in which one positive electrode plate and one negative electrode plate are wound together with a separator, a stacking type in which a plurality of positive electrode plates and a plurality of negative electrode plates are alternately stacked with a separator interposed therebetween, or the like.

Also, the pouch exterior 115 may include an outer insulating layer, a metal layer and an inner adhesive layer. Moreover, the pouch exterior 115 may contain a metal thin film, such as an aluminum thin film, to protect inner components such as the electrode assembly and the electrolyte and to improve the electrochemical properties of the electrode assembly and the electrolyte and enhance heat dissipation.

In addition, the aluminum thin film may be interposed between insulating layers made of an insulating material to ensure electrical insulation with components inside the secondary battery 100, such as the electrode assembly and the electrolyte, or other components outside the secondary battery 100.

Further, the pouch exterior 115 may have two pouches, at least one of which may have a concave interior space. In addition, the electrode assembly may be accommodated in the inner space of the pouch. Also, outer circumferential surfaces of the two pouches may be fused to each other so that the inner space accommodating the electrode assembly is sealed. For example, as shown in FIG. 3, a sealed terrace portion 117 may be formed at the outer circumferential surface of the pouch exterior 115.

Further, each pouch-type secondary battery 100 may include an electrode lead 111, and the electrode lead 111 may include a positive electrode lead 111a and a negative electrode lead 111b. Here, each of the electrode leads 111a, 111b may have a plate shape so that two wide surfaces are located at upper and lower portions thereof.

In addition, the electrode lead 111 may be configured to protrude outward from the terrace portion 117 located at one outer circumference of the pouch exterior 115. That is, the electrode lead 111 may be drawn out of the pouch exterior 115 through the terrace portion 117 of the pouch exterior 115.

For example, as shown in FIG. 3, one electrode lead 111a may be configured to protrude at one side of one edge of the terrace portion 117 of the secondary battery 100, and the other electrode lead 111b may be spaced apart from one electrode lead 111a by a predetermined distance and configured to protrude at the other side of one edge of the terrace portion 117.

The configuration of the pouch-type secondary battery 100 described above is obvious to those skilled in the art and thus is not described in detail here. In addition, various kinds of secondary batteries 100 known at the time of filing this application may be employed at the battery pack 200 according to the present disclosure.

Referring to FIGS. 2 and 3 again, the secondary battery 100 may include a current blocking member 300 welded to the electrode lead 111b.

Specifically, the current blocking member 300 may include a current blocking element 310, a first connection member 320 and a second connection member 330. In addition, both sides of the current blocking element 310 are electrically connected to the first connection member 320 and the second connection member 330, respectively.

Further, the first connection member 320 may be coupled to be electrically connected to the electrode lead 111b of the secondary battery 100.

In addition, the second connection member 330 may be electrically connected to another component of the battery pack 200. For example, the second connection member 330 may be electrically connected to the battery management unit 270 of the battery pack 200.

For example, as shown in FIG. 3, the current blocking member 300 may be located on the terrace portion 117 of the secondary battery 100. Further, one end of the first connection member 320 may be coupled to the current blocking element 310, and a portion of the first connection member 320 may be coupled to the electrode lead 111b.

In addition, the battery frame 210 may include a battery accommodation portion 212 configured to accommodate the at least one secondary battery 100. Further, an opening 01 having a size corresponding to a bottom surface of the secondary battery 100 may be formed in the battery accommodation portion 212. In addition, the battery frame 210 may have a rectangular frame shape having a rectangular outermost edge 211.

For example, as shown in FIG. 2, the battery accommodation portion 212 accommodating four secondary batteries 100 is formed in the battery frame 210. In addition, four openings 01 having sizes corresponding to the bottom surface of the secondary batteries 100 may be formed in the battery accommodation portion 212.

Thus, according to this configuration of the present disclosure, since the opening O1 having a size corresponding to the lower surface of the secondary battery 100 is formed in the battery accommodation portion 212 formed in the battery frame 210, the heat generated from the secondary battery 100 may be efficiently dissipated out of the battery frame 210.

For example, the battery frame 210 may include at least one selected from polyethylene terephthalate (PET), polyethylene (PE), polypropylene (PP), polystyrene (PS), and polyvinyl chloride (PVC). However, without being limited to these materials, any material having electrical insulation that may be applied to the battery frame 210 and capable of being lightweight is available.

Figure 4:
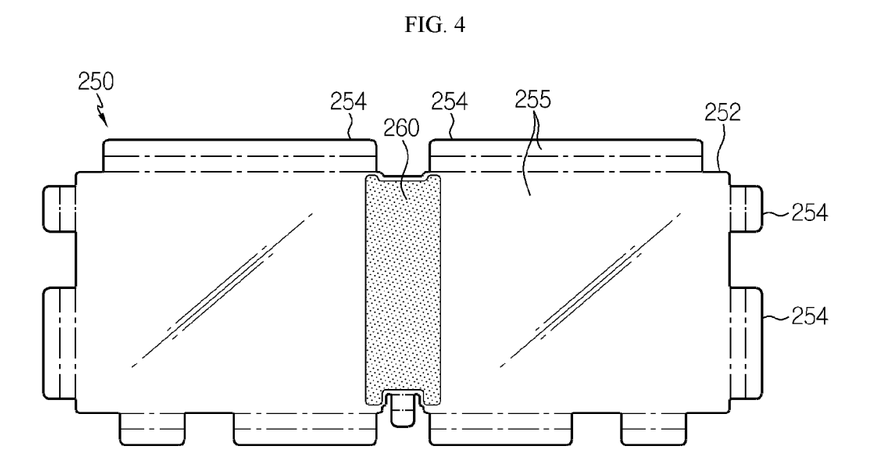
FIG. 4 is a bottom view schematically showing a packaging member, employed at the battery pack according to an embodiment of the present disclosure.

FIG. 4 is a bottom view schematically showing a packaging member, employed at the battery pack according to an embodiment of the present disclosure. Also, FIG. 5 is a plan view schematically showing some components of the battery pack according to an embodiment of the present disclosure.

Figure 5:
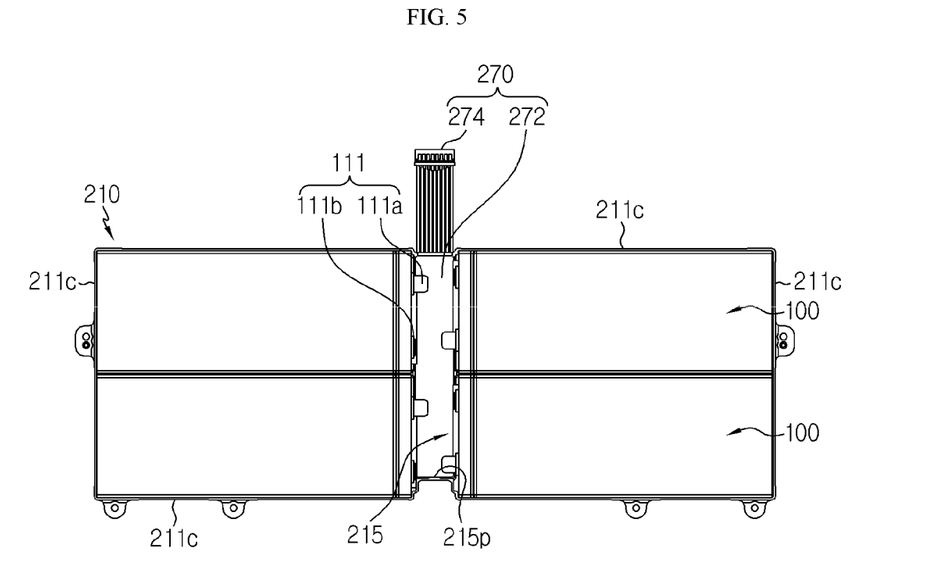
FIG. 5 is a plan view schematically showing some components of the battery pack according to an embodiment of the present disclosure.

Referring to FIGS. 4 and 5 along with FIG. 2, the packaging member 250 may be in the form of an adhesive sheet having an adhesive surface 255 formed on one surface thereof. Specifically, the sheet member of the packaging member 250 may include a material such as polyethylene terephthalate (PET). For example, an adhesive surface 255 formed by applying an adhesive material may be formed on one surface (inner surface) of the sheet member of the packaging member 250. In addition, letters or various shapes may be printed on the other surface (outer surface) of the sheet member of the packaging member 250.

More specifically, the packaging member 250 may include a body portion 252 and a fixing portion 254. In addition, the body portion 252 may include a portion that is fixedly adhered to the upper portion of the secondary battery 100 accommodated in the battery frame 210. Further, a part of the body portion 252 may be adhered to at least a portion of the upper surface of the battery frame 210. For example, when viewed in the F direction, the body portion 252 may be configured to be adhered to the upper surfaces of the secondary battery 100 and the battery frame 210.

Here, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

In addition, the fixing portion 254 may be bent and extended downward from the body portion 252 and serve as a portion where the adhesive surface 255 is fixedly adhered to a horizontal (x-y directional) outer surface of the outermost edge 211 (FIG. 2) of the battery frame 210.

For example, as shown in FIG. 2, the packaging member 250 having a side portion to which the upper portion and the horizontal side of the battery frame 210 are adhered may include a body portion 252 and a fixing portion 254. In addition, the body portion 252 may be a region that is fixedly adhered to the upper portion of the secondary battery 100 and the battery frame 210, and the fixing portion 254 may be a region that is fixedly adhered to the outer surface of the outermost edge 211 of the battery frame 210.

In addition, the battery pack 200 may further include a second packaging member 230. Specifically, the second packaging member 230 may have a sheet shape to surround the lower surface of the battery frame 210. Also, an adhesive may be applied to an upper surface of the second packaging member 230 to form the adhesive surface 232. Thus, the second packaging member 230 may be formed to cover the lower surface of the secondary battery 100 mounted to the battery frame 210 and the lower surface of the battery frame 210.

Referring to FIG. 5 along with FIG. 4, the upper surface of the anti-noise member 260 may have in the form of a sheet or a block. In addition, the anti-noise member 260 may be configured to be adhered to at least one portion of the adhesive surface 255 of the packaging member 250. For example, the anti-noise member 260 may be in the form of a flat sheet having at least one of polyethylene terephthalate, polypropylene, polyethylene, vinyl, and polystyrene. In addition, the anti-noise member 260 may be in the form of a block (not shown) having a fiber, rubber or silicone material.

Further, the anti-noise member 260 may have a size corresponding to a portion where a gap is formed in the vertical direction between the packaging member 250 and the battery frame 210, and the anti-noise member 260 may be added at a position corresponding to the portion where the gap is formed. For example, as shown in FIG. 4, the anti-noise member 260 may be added to be attached to a central portion of the adhesive surface 255 formed at the lower surface of the packaging member 250.

Meanwhile, in the prior art, while a user uses an electronic device including the battery pack 200, the battery frame 210 of the battery pack 200 may be easily distorted due to the force of the user. At this time, the electronic device is likely to generate noise frequently at a portion where a gap is formed between the adhesive surface 255 of the packaging member 250 and the battery frame 210. That is, a large noise may be generated when the adhesive surface 255 of the packaging member 250 is detached from the battery frame 210. For example, the electronic device may be a tablet PC or notebook.

However, according to this configuration of the present disclosure, since the battery pack 200 includes the anti-noise member 260 attached to at least one portion of the adhesive surface 255 of the packaging member 250, it is possible to prevent that noise is generated as the adhesive surface 255 of the packaging member 250 attached to the outer surface of the battery frame 210 is detached therefrom.

Referring to FIGS. 2 and 5 again, the battery pack 200 may further include a battery management unit 270 that controls charging and discharging of at least one secondary battery 100. Specifically, the battery management unit 270 may be disposed between the two or more secondary batteries 100. For example, as shown in FIG. 2, four secondary batteries 100 may be accommodated in the battery frame 210 with the battery management unit 270 being disposed at the center thereof.

In addition, the battery management unit 270 may include a printed circuit board 272. Also, the printed circuit board 272 may include a connection portion (not shown) to which the electrode lead 111 of the secondary battery 100 and the current blocking member 300 may be electrically and mechanically connected. Further, the battery management unit 270 may include an element (not shown) capable of controlling the charge/discharge voltage and/or current of the secondary battery 100 or an element (not shown) capable of protecting the secondary battery 100 from being overcharged and/or overdischarged. Moreover, an external power connector 274 may be coupled to one side of the printed circuit board 272 of the battery management unit 270 and extend outward, and the external power connector 274 may be electrically connected to an external device.

Further, a control accommodation portion 215 having a space recessed to accommodate the battery management unit 270 may be formed at the battery frame 210. For example, the control accommodation portion 215 may be formed at one side of the battery accommodation portion 212 of the battery frame 210. In addition, if a plurality of secondary batteries 100 are provided, the control accommodation portion 215 may be formed between the plurality of battery accommodation portions 212 of the battery frame 210.

Further, the anti-noise member 260 may be formed at a portion of the adhesive member surface 255 of the packaging member 250, which faces the battery management unit 270. That is, in the control accommodation portion 215 in which the battery management unit 270 is accommodated, a region where a gap is generated between the body portion 252 of the packaging member 250 and the battery management unit 270 or the control accommodation portion 215 may be distributed most. Thus, the adhesive surface 255 of the packaging member 250 of the battery pack 200 is easily attached to or detached from the battery frame 210 in the control accommodation portion 215.

For example, as shown in FIG. 4, the anti-noise member 260 may be attached to a central portion of the adhesive surface 255 of the packaging member 250, which faces the battery management unit 270. In addition, the anti-noise member 260 may be shaped to cover an upper surface of the control accommodation portion 215.

Thus, according to this configuration of the present disclosure, since the anti-noise member 260 is formed in a portion of the adhesive surface 255 of the packaging member 250, which corresponds to the control accommodation portion 215 accommodating the battery management unit 270 where noise is frequently generated noise, it is possible to significantly reduce the noise generated by the battery pack 200. Accordingly, the electronic device including the battery pack 200 may be used conveniently.

Figure 6:
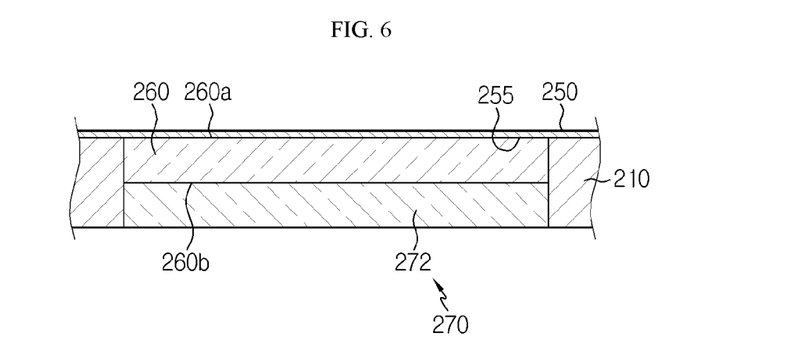
FIG. 6 is a partial sectioned view schematically showing a portion of the battery pack, taken along the line C-C' of FIG. 1.

FIG. 6 is a partial sectioned view schematically showing a portion of the battery pack, taken along the line C-C' of FIG. 1.

Referring to FIGS. 5 and 6 together, the anti-noise member 260 may have a ridged portion 260b protruding downward from the fixed surface 260a adhered to the adhesive surface 255 of the packaging member 250. In addition, the ridged portion 260b may protrusively extend to be in close contact with the outer surface of the battery management unit 270. More specifically, the ridged portion 260b may be configured to contact the upper surface of the printed circuit board 272 included in the battery management unit 270 and the upper surface of the control accommodation portion 215 of the battery frame 210. For example, the ridged portion 260b of the anti-noise member 260 may have a block form made of fiber, rubber or silicon material.

For example, as shown in FIG. 6, the anti-noise member 260 may have the ridged portion 260b extending downward from the fixed surface 260a. In addition, the ridged portion 260b may be configured to be in close contact with the upper surface of the printed circuit board 272 located therebelow.

Thus, according to this configuration of the present disclosure, since the anti-noise member 260 has the ridged portion 260b formed to be in close contact with the battery management unit 270, the gap that may be generated between the packaging member 250 and the battery management unit 270 may be reduced as much as possible. Accordingly, the noise generated from the battery pack 200 may be effectively reduced.

Figure 7:
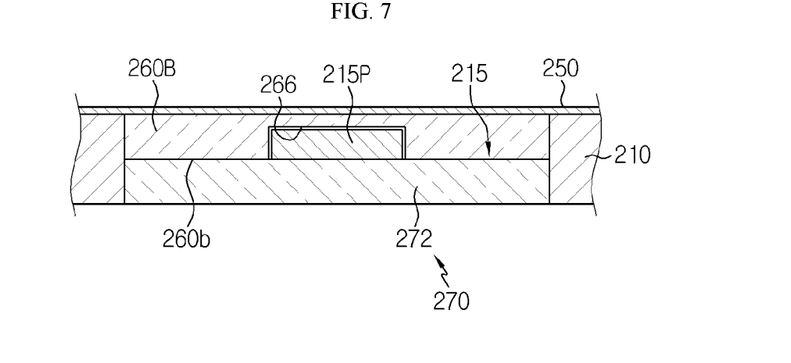
FIG. 7 is a partial sectioned view schematically showing a portion of the battery pack, taken along the line D-D' of FIG. 1.

FIG. 7 is a partial sectioned view schematically showing a portion of the battery pack, taken along the line D-D' of FIG. 1.

Referring to FIG. 7 along with FIG. 5, an uneven structure 266 dented and protruding according to the shape of the outer surface of the battery management unit 270 may be formed at the ridged portion 260b of the anti-noise member 260B. In addition, the control accommodation portion 215 of the battery frame 210 may have a fixing protrusion 215P formed to protrude toward the printed circuit board 272 so as to prevent the printed circuit board 272 of the battery management unit 270 from being detached to the outside.

For example, as shown in FIG. 7, the uneven structure 266 dented and protruding according to the shape of the outer surface of the fixing protrusion 215P may be formed at the ridged portion 260b of the anti-noise member 260B.

Thus, according to this configuration of the present disclosure, since the uneven structure 266 is formed in the ridged portion 260b of the anti-noise member 260B configured to closely contact the battery management unit 270, it is possible to reduce the gap that may be formed between the packaging member 250 and the printed circuit board 272 of the battery management unit 270 as much as possible. Accordingly, the noise generated from the battery pack 200 may be further reduced.

Figure 8:
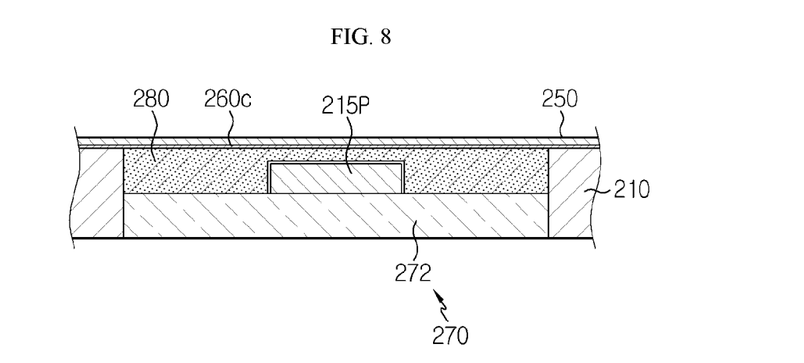
FIG. 8 is a partial sectioned view schematically showing a portion of a battery pack according to another embodiment of the present disclosure.

FIG. 8 is a partial sectioned view schematically showing a portion of a battery pack according to another embodiment of the present disclosure.

Referring to FIG. 8, a thermally conductive material 280 may be added between the anti-noise member 260c and the battery management unit 270 so that no gap is created therebetween.

Further, the thermally conductive material 280 may include a polymer resin or a silicone-based resin with high thermal conductivity, and a filler. For example, the polymer resin may be a polysiloxane resin, a polyamide resin, a urethane resin, or an epoxy resin. In addition, for example, the thermally conductive material 280 may include an electrically insulating material such as a urethane resin or a silicone resin. Further, the filler may be a metal component such as aluminum or copper with high thermal conductivity.

For example, as shown in FIG. 8, the thermally conductive material 280 may be interposed between the anti-noise member 260c and the battery management unit 270 mounted to the battery frame 210 so that no gap is created therebetween. That is, the thermally conductive material 280 may be added to surround a portion of the outer surface of the printed circuit board 272 and the fixing protrusion 215P.

Thus, according to this configuration of the present disclosure, if the thermally conductive material 280 is added to be interposed between the anti-noise member 260c and the battery management unit 270, an empty space that may be generated between the anti-noise member 260c and the battery management unit 270 may be minimized, thereby preventing the noise from being generated due to the empty space in advance and reducing the amount of air occupied in the empty space. In addition, since the thermal conductivity of the heat generated from the secondary battery 100 may be significantly increased, it is possible to improve the cooling efficiency of the battery pack 200.

Figure 9:
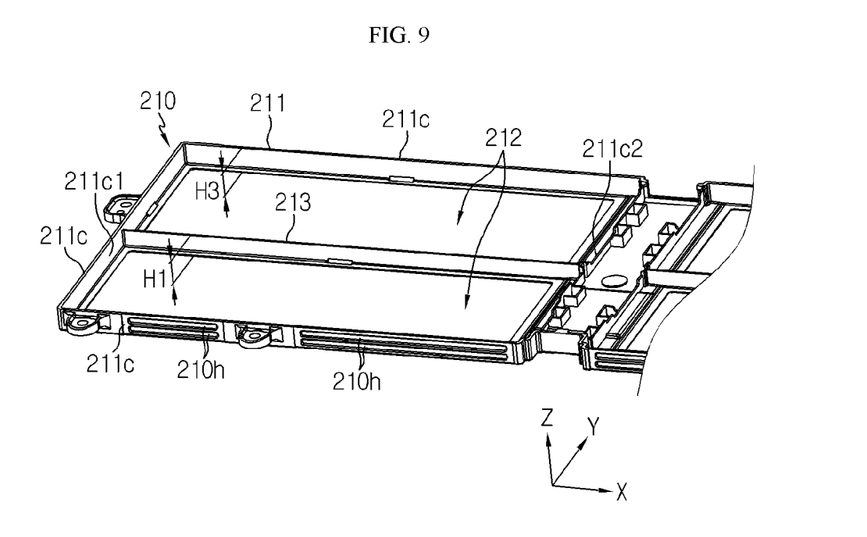
FIG. 9 is a partial perspective view schematically showing a battery frame, employed at the battery pack according to an embodiment of the present disclosure.

FIG. 9 is a partial perspective view schematically showing a battery frame, employed at the battery pack according to an embodiment of the present disclosure.

Referring to FIG. 9, at least one dented groove 210h recessed onward may be formed at the horizontal (x-y direction) outer surface 211c of the outermost edge 211 of the battery frame 210. In addition, the dented groove 210h may extend in an edge direction of the outermost edge 211. Moreover, when viewed in the F direction (toward the front) of FIG. 1, the dented groove 210h may have an ellipse shape.

Further, two or more dented grooves 210h may be formed at the horizontal (x-y direction) outer surface 211c of the outermost edge 211 of the battery frame 210. In addition, the two or more dented grooves 210h may be formed to be spaced apart from each other by a predetermined distance.

For example, as shown in FIG. 9 along with FIG. 5, four outer surfaces 211c may be formed at the outermost edge 211 of the battery frame 210. In addition, a pair of dented grooves 210h spaced apart from each other by a predetermined distance may be formed at each of the four outer surfaces 211c.

Thus, according to this configuration of the present disclosure, the dented groove 210h formed at the battery frame 210 may reduce the weight of the battery frame 210, thereby reducing the weight of the battery pack 200.

Figure 10:
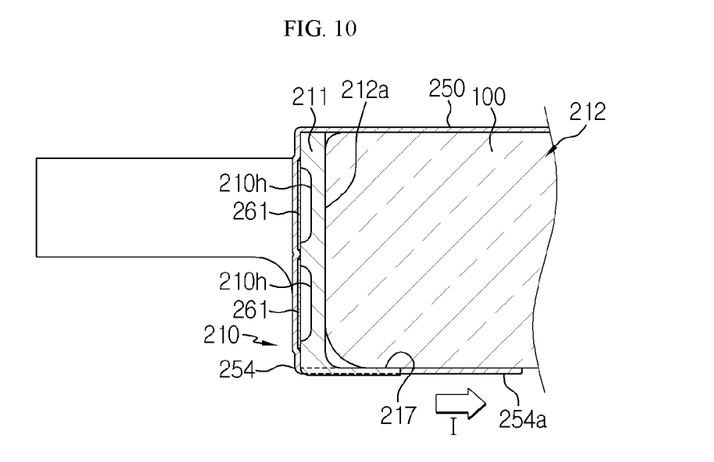
FIG. 10 is a partial sectioned view schematically showing a portion of the battery pack, taken along the line A-A' of FIG. 1.

FIG. 10 is a partial sectioned view schematically showing a portion of the battery pack, taken along the line A-A' of FIG. 1.

Referring to FIG. 10 along with FIG. 4, the anti-noise member 261 may be formed at a portion of the adhesive surface 255 of the packaging member 250, which faces the dented groove 210h. Specifically, the anti-noise member 261 may have a size that may be at least partially inserted into the dented groove 210h or may have a larger size than the dented groove 210h.

For example, as shown in FIG. 10, two dented grooves 210h may be spaced apart by a predetermined distance in the vertical direction at the horizontal outer surface of the outermost edge 211 of the battery frame 210, and the two anti-noise members 261 may be formed to face the two dented grooves 210h.

In addition, the anti-noise member 261 may be made of a very light material allowing easy shape deformation and fill the inner space of the dented groove 210h. Moreover, the anti-noise member 261 may be in the form of a flat sheet covering the outer periphery of the dented groove 210h.

For example, as shown in FIG. 10, two anti-noise members 261 in the form of a flat sheet may be formed to face the outer periphery of the two dented grooves 210h, respectively.

Thus, according to this configuration of the present disclosure, since the anti-noise member 261 is added at a position corresponding to the dented groove 210h, it is possible to prevent that noise is generated as the outermost edge 211 of the battery frame 210 is distorted and thus the dented groove 210h and the packaging member 250 are attached and detached. Thus, the convenience in use of the product may be increased.

Figure 11:
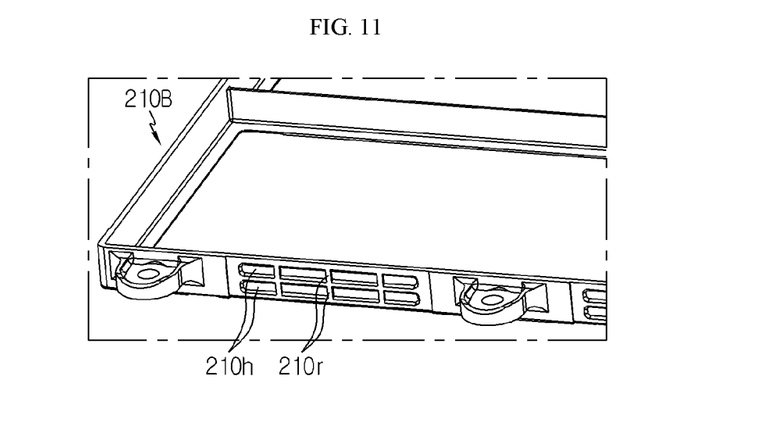
FIG. 11 is a partial perspective view schematically showing a battery frame, employed at a battery pack according to another embodiment of the present disclosure.

FIG. 11 is a partial perspective view schematically showing a battery frame, employed at a battery pack according to another embodiment of the present disclosure.

Referring to FIG. 11, at least one rib 210r may be formed at the dented groove 210h of the battery frame 210B. Specifically, the rib 210r may protrude outward. Also, the rib 210r may extend from one inner side of the dented groove 210h to the other inner side thereof.

For example, as shown in FIG. 11, when viewed in the F direction of FIG. 1, the two dented grooves 210h formed at the battery frame 210B may have a plurality of ribs 210r protruding outward and extending from an upper side of the inside of the two dented grooves 210h to a lower side thereof.

Thus, according to this configuration of the present disclosure, the mechanical rigidity of the outermost edge 211 of the battery frame 210B that is thinned due to the dented groove 210h formed at the battery frame 210B may be compensated with the formed at least one rib 210r. Accordingly, the durability of the battery pack 200 may be improved.

Meanwhile, referring to FIG. 9 along with FIG. 5, the battery frame 210 may include two or more secondary batteries 100. In addition, a barrier 213 may be formed in the battery accommodation portion 212 of the battery frame 210 so that the two or more secondary batteries 100 are separately accommodated therein. Further, the barrier 213 may extend from one inner side 211c1 of the battery frame 210 to the other inner side 211c2 thereof. That is, the barrier 213 may extend from one inner side 211c1 of the outermost edge 211 to the other inner side 211c2 thereof to partition the internal space of the battery accommodation portion 212 included in the battery frame 210.

In addition, the vertical height H1 of the barrier 213 may be lower than the height of the upper portion of the two or more secondary batteries 100 accommodated in the battery frame 210. Also, the vertical height H1 of the barrier 213 may be lower than the height H3 of the upper side of the outermost edge 211 of the battery frame 210.

For example, as shown in FIGS. 2 and 9, the battery frame 210 may have the battery accommodation portion 212 to accommodate four secondary batteries 100. Also, the battery frame 210 may have the barrier 213 extending from one inner side 211c1 of the outermost edge 211 of the battery frame 210 to the other inner side 211c2 thereof so that the two secondary batteries 100 are accommodated in each partitioned area.

Further, the vertical height H1 of the barrier 213 may be lower than the height of the upper portion of the secondary battery 100 accommodated in the battery accommodation portion 212. In addition, the vertical height H1 of the barrier 213 may be lower than the height H3 of the outermost edge 211 of the battery frame 210.

Thus, according to this configuration of the present disclosure, since the vertical height H1 of the barrier 213 is lower than the height of the upper portion of the secondary battery 100 accommodated in the battery accommodation portion 212, the packaging member 250 is located to be spaced apart from the barrier 213 in the upper direction, and it is possible to reduce the noise generated by attachment and detachment of the packaging member 250.

That is, when viewed in the F direction (shown in FIG. 1), the position of the barrier 213 formed at the center of the battery frame 210 in the front and rear direction (y direction) is a place where the battery frame 210 is deformed frequently due to distortion. Thus, by preventing the barrier 213 and the packaging member 250 from being adhered to each other in advance, it is possible to prevent noise from being generated due to attachment and detachment of the packaging member 250.

Figure 12:
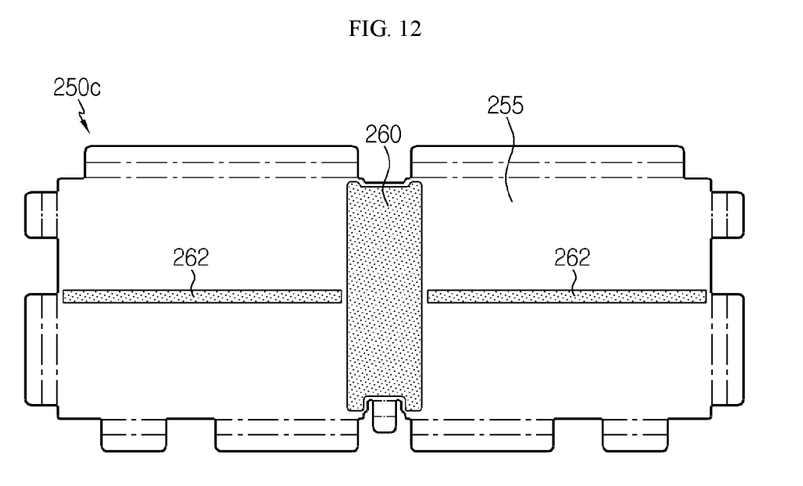
FIG. 12 is a bottom view schematically showing a packaging member, employed at the battery pack according to another embodiment of the present disclosure.

FIG. 12 is a bottom view schematically showing a packaging member, employed at the battery pack according to another embodiment of the present disclosure.

Referring to FIG. 12 along with FIGS. 2 and 9, a battery pack (not shown) according to another embodiment of the present disclosure may include another anti-noise member 262 in addition to the anti-noise member 260 formed at a position facing the battery management unit 270.

Specifically, the anti-noise member 262 may be formed on at least a portion of the adhesive surface 255 of the packaging member 250, which faces the barrier 213. Specifically, the anti-noise member 262 is formed at a position facing the barrier 213 that extends from one inner side of the outermost edge 211 of the battery frame 210 to the other inner side thereof so that the two or more secondary batteries 100 are separately accommodated.

For example, as shown in FIG. 12, the anti-noise member 262 may be formed at a position on the adhesive surface 255 of the packaging member 250, which corresponds to each of the two barriers 213 formed in the battery accommodation portion 212 of the battery frame 210. In addition, the anti-noise member 262 may have a strip shape extending in the left and right direction.

Thus, according to this configuration of the present disclosure, since the anti-noise member 262 is formed on at least a portion of the adhesive surface 255 of the packaging member 250, which faces the barrier 213, it is possible to prevent the barrier 213 from contacting the adhesive surface 255 of the packaging member 250 in advance.

Accordingly, by preventing the barrier 213 from contacting the packaging member 250, it is possible to reduce noise generated due to attachment and detachment of the packaging member 250 to/from the upper side of the barrier 213.

Meanwhile, referring to FIGS. 4, 9 and 10 again, the fixing portion 254 of the packaging member 250 may be bent and extended downward from the body portion 252.

In addition, a terminal 254a of the fixing portion 254 may be bent and extended inward (I) so that the adhesive surface 255 (FIG. 4) is attached to the lower surface of the secondary battery 100.

In addition, a support 217 protrusively extending inward (I) may be formed on the inner surface 212a of the inner space of the battery accommodation portion 212. Further, the support 217 may support the lower portion of the secondary battery 100 upward.

For example, as shown in FIG. 9, the support 217 protrusively extending inward may be formed along the outermost edge 211 of the battery frame 210. In this case, the support 217 may be formed at a position that supports the lower portion of the secondary battery 100 upward.

Here, the support 217 may generate a momentum for supporting the secondary battery 100 upward, and the fixing portion 254 of the packaging member 250 attached to the lower surface of the secondary battery 100 may generate a momentum for pressing the secondary battery 100 downward. In addition, since the two momentums are applied in opposite directions, the forces of the two momentums may be offset by each other. Accordingly, it is possible to prevent the outermost edge 211 of the battery frame 210 from being frequently deformed, thereby preventing noise generated by the deformation of the battery frame 210 and improving the durability of the battery frame 210.

Thus, according to this configuration of the present disclosure, since the fixing portion 254 of the packaging member 250 is attached to the lower surface of the secondary battery 100 and the support 217 supports the secondary battery 100 upward, the vertical stress caused by the weight of the secondary battery 100 mounted to the battery frame 210 may be offset, thereby improving the durability of the battery frame 210.

Figure 13:
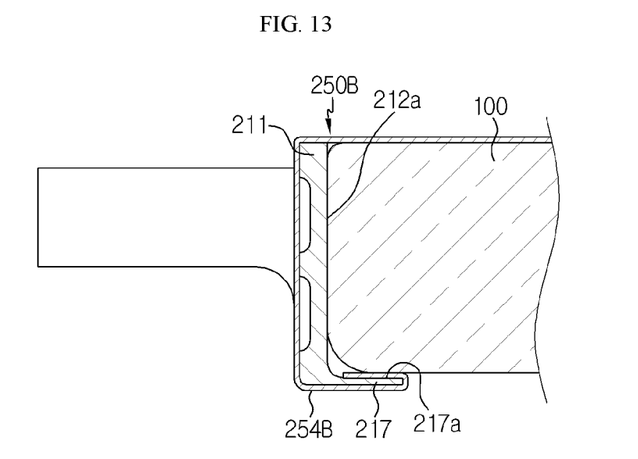
FIG. 13 is a partial sectioned view schematically showing a portion of a battery pack according to still another embodiment of the present disclosure.

FIG. 13 is a partial sectioned view schematically showing a portion of a battery pack according to still another embodiment of the present disclosure.

Referring to FIG. 13, the fixing portion 254B of the packaging member 250B may be formed to be attached to the inner surface of the support 217 formed on the inner surface 212a of the inner space of the battery accommodation portion 212.

For example, as shown in FIG. 13, the fixing portion 254B of the packaging member 250B may be bent and extended toward the inner side of the battery frame 210, and the bent and extended end is bent outward again and attached to an inner surface 217a of the support 217. In addition, an end of the fixing portion 254B of the packaging member 250B may be interposed between the lower surface of the secondary battery 100 accommodated in the battery frame 210 and the upper surface of the support 217.

Thus, according to this configuration of the present disclosure, since the fixing portion 254B of the packaging member 250B is attached to the inner surface of the support 217 formed at the battery frame 210, if the packaging member 250B of FIG. 13 is used, the fixing portion 254B may be adhered to the battery frame 210 with an enhanced fixing force, compared to the case where the fixing portion 254 of the packaging member 250 is adhered to the lower surface of the secondary battery 100 as shown in FIG. 10.

In addition, since a part of the fixing portion 254B of the packaging member 250B is interposed between the lower surface of the secondary battery 100 accommodated in the battery frame 210 and the upper surface of the support 217, it is possible to enhance the fixing force of the fixing portion 254B of the packaging member 250B further.

In particular, if the anti-noise member 260 is attached to the packaging member 250B in a wide range, the fixing force between the packaging member 250B and the battery frame 210 may be deteriorated. However, since a part of the fixing portion 254B of the packaging member 250B is interposed between the lower surface of the secondary battery 100 accommodated in the battery frame 210 and the upper surface of the support 217, the fixing force may be supplemented.

Moreover, an electronic device (not shown) according to the present disclosure may include the battery pack 200. Also, the battery pack 200 may be accommodated in an external case of the electronic device. In this case, the electronic device may be configured to operate by receiving a power from the battery pack 200. For example, the electronic device may include a connection connector for connecting with an external input/output terminal or a data connector of the battery pack 200 so that the electronic device may operate by receiving a power.

In addition, an electronic system according to the present disclosure may include the electronic device. Further, the electronic system may be, for example, an acoustic system, and the electronic device may be a notebook or a tablet PC. Thus, the electronic device may be configured to control the acoustic system.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery pack | |
| 100: secondary battery | 111: electrode terminal |
| 210: battery frame | 250: packaging member |

-continued

| Reference Signs | |
|---|---|
| 252: body portion | 254: fixing portion |
| 212: battery accommodation portion | 215: control accommodation portion |
| 260, 261, 262: anti-noise member | 270: battery management unit |
| 210h: dented groove | 210r: rib |
| 213: barrier | 217: support |

INDUSTRIAL APPLICABILITY

The present disclosure relates to a battery pack including an anti-noise member. In addition, the present disclosure is available for industries associated with electronic devices or electronic systems including the battery pack.

What is claimed is:

1. A battery pack, comprising:
   two or more rechargeable secondary batteries;
   a battery frame having a battery accommodation portion configured to accommodate the two or more rechargeable secondary batteries;
   a first packaging member provided in the form of an adhesion sheet having an adhesive surface formed at one surface thereof, the first packaging member including a body portion fixedly adhered to an upper portion of at least one rechargeable secondary battery accommodated in the battery frame and a fixing portion bent and extended downward from the body portion and having the adhesive surface fixedly adhered to an outer surface of an outermost edge of the battery frame;
   a second packaging member having an adhesive surface and fixedly adhered to a lower portion of the at least one rechargeable secondary battery accommodated in the battery frame;
   a first anti-noise member attached to at least one portion of the adhesive surface of the first packaging member in a first direction; and
   a second anti-noise member entirely attached to another portion of the adhesive surface of the first packaging member in a second direction intersecting the first direction,
   wherein a barrier extending from one inner side of the outermost edge of the battery frame to the other inner side thereof is formed in the battery accommodation portion of the battery frame so that the two or more rechargeable secondary batteries are separately accommodated therein,
   wherein a vertical height of the barrier is lower than a height of an upper portion of the two or more rechargeable secondary batteries accommodated in the battery accommodation portion,
   wherein the second anti-noise member is aligned with the barrier,
   wherein the second anti-noise member is interposed between the barrier and the adhesive surface of the first packaging member,
   wherein at least one dented groove recessed inward and extending along an edge direction of the outermost edge is formed at a horizontal outer surface of the outermost edge of the battery frame,
   wherein a third anti-noise member is formed at a portion of the adhesive surface of the first packaging member, which faces the dented groove, and
   wherein a portion of the third anti-noise member fills an inner space of the dented groove or forms a flat sheet covering an outer periphery of the dented groove.

2. The battery pack according to claim 1, further comprising:
   a battery management unit configured to control charging and discharging of the at least one rechargeable secondary battery,
   wherein a control accommodation portion having a recessed space to accommodate the battery management unit is formed at the battery frame, and
   wherein the first anti-noise member is formed at a portion of the adhesive surface of the first packaging member, which faces the battery management unit.

3. The battery pack according to claim 2, wherein the first anti-noise member has a ridged portion extending to be in contact with an outer surface of the battery management unit.

4. The battery pack according to claim 3, wherein an uneven structure dented or protruding according to a shape of the outer surface of the battery management unit or the control accommodation portion is formed at the ridged portion of the first anti-noise member.

5. The battery pack according to claim 2, wherein a thermally conductive material is added between the first anti-noise member and the battery management unit so that no gap is created therebetween.

6. The battery pack according to claim 1, wherein a rib protruding outward and extending from one inner side of the dented groove to the other inner side thereof is formed at the dented groove of the battery frame.

7. The battery pack according to claim 1, wherein another barrier extending from one inner side of the outermost edge of the battery frame to the other inner side thereof is formed in the battery accommodation portion of the battery frame so that the two or more rechargeable secondary batteries are separately accommodated therein, and
   wherein the first anti-noise member is formed at a portion of the adhesive surface of the first packaging member, which faces the barrier.

8. The battery pack according to claim 1, wherein the fixing portion of the first packaging member is bent and extended inward so that the adhesive surface thereof is attached to a lower surface of the at least one rechargeable secondary battery, and
   wherein a support protrusively extending inward to support a lower portion of the at least one rechargeable secondary battery upward is formed at an inner surface of an inner space of the battery accommodation portion.

9. An electronic device, comprising the battery pack according to claim 1.

10. An electronic system, comprising the electronic device according to claim 9.

11. The battery pack according to claim 1, wherein the second anti-noise member has a strip shape extending in the second direction.

* * * * *